United States Patent
Tokura et al.

(10) Patent No.: US 10,977,825 B2
(45) Date of Patent: Apr. 13, 2021

(54) POSITION MEASUREMENT DEVICE AND POSITION MEASUREMENT METHOD

(71) Applicants: SUMITOMO MITSUI CONSTRUCTION CO, LTD., Tokyo (JP); KYUSHU UNIVERSITY, NATIONAL UNIVERSITY CORPORATION, Fukuoka (JP)

(72) Inventors: Kentaro Tokura, Tokyo (JP); Naoki Nagamoto, Tokyo (JP); Takao Kakehashi, Tokyo (JP); Motohiro Ikehara, Tokyo (JP); Hideaki Uchiyama, Fukuoka (JP)

(73) Assignees: SUMITOMO MITSUI CONSTRUCTION CO., LTD., Tokyo (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 21 days.

(21) Appl. No.: 16/480,080

(22) PCT Filed: Jan. 30, 2018

(86) PCT No.: PCT/JP2018/002854
§ 371 (c)(1),
(2) Date: Jul. 23, 2019

(87) PCT Pub. No.: WO2018/143153
PCT Pub. Date: Aug. 9, 2018

(65) Prior Publication Data
US 2019/0378299 A1    Dec. 12, 2019

(30) Foreign Application Priority Data
Feb. 3, 2017 (JP) ............................ JP2017-018213

(51) Int. Cl.
*G06T 7/73* (2017.01)
*G06T 7/579* (2017.01)
(Continued)

(52) U.S. Cl.
CPC .................. *G06T 7/74* (2017.01); *G06T 7/11* (2017.01); *G06T 7/174* (2017.01); *G06T 7/579* (2017.01)

(58) Field of Classification Search
CPC ... G06T 7/11; G06T 7/174; G06T 7/50; G06T 7/55; G06T 7/579; G06T 7/593;
(Continued)

(56) References Cited

U.S. PATENT DOCUMENTS

| 8,081,815 B2 | 12/2011 | Kotake et al. ................ 382/154 |
| 9,182,220 B2 | 11/2015 | Kochi et al. ............ G01B 11/24 |

(Continued)

FOREIGN PATENT DOCUMENTS

| JP | 2007-271408 A | 10/2007 |
| JP | 2008-065807 A | 3/2008 |

(Continued)

OTHER PUBLICATIONS

International Search Report dated Aug. 9, 2018 for corresponding PCT Application No. PCT/JP2018/002854.
(Continued)

*Primary Examiner* — Andrew W Johns
(74) *Attorney, Agent, or Firm* — Duane Morris LLP

(57) ABSTRACT

[Problem] To enable three-dimensional measurement with good precision.
[Solution] When three-dimensional measurement is to be performed with good precision using SLAM or the like, images of marks M1, M2, M3, M4 must be captured from various directions by a single-lens camera. In the present invention, directions of imaging by a camera are displayed
(Continued)

as sectors C1, C2, C3, C4. For example, it is understood that whereas sectors C1 and C4 have a large central angle and imaging therein is performed from a wide range of directions, sectors C2 and C3 have a small central angle and imaging therein is performed from a narrow range of directions. A photographer seeing such a display can perform additional imaging, and images can therefore be obtained from a wide range of directions, and three-dimensional measurement can be performed with good precision.

6 Claims, 5 Drawing Sheets

(51) Int. Cl.
*G06T 7/11* (2017.01)
*G06T 7/174* (2017.01)

(58) Field of Classification Search
CPC .... G06T 7/70; G06T 7/73; G06T 7/74; G06T 7/97; G01B 11/22; G01B 21/18
See application file for complete search history.

(56) References Cited

U.S. PATENT DOCUMENTS

| 9,429,418 B2 | 8/2016 | Mitarai et al. ......... G01B 11/03 |
| 2011/0025829 A1 | 2/2011 | McNamer et al. ............. 348/50 |
| 2016/0239952 A1* | 8/2016 | Tanaka ...................... G06T 7/70 |

FOREIGN PATENT DOCUMENTS

| JP | 2010-218173 A | 9/2010 |
| JP | 2010-219825 A | 9/2010 |
| JP | 2011-198349 A | 10/2011 |

OTHER PUBLICATIONS

Prof A. Zisserman, "C4 Computer Vision", 4 Lectures, Michaelmas Term 2004, pp. 1-37.

* cited by examiner

POSITION MEASUREMENT DEVICE AND POSITION MEASUREMENT METHOD

TECHNICAL FIELD

This invention relates to a position measurement device and a position measurement method for capturing two or more images of one marker from different angles while moving a camera and obtaining a three-dimensional position of the marker and/or the camera based on two or more obtained images.

BACKGROUND ART

When performing a three-dimensional measurement with a camera (a monocular camera), such as SLAM, it is necessary to capture images of one marker at different angles from two or more image capturing positions while moving the camera. FIG. 5 is a typical view that shows an instance of a way of capturing images of the marker from two image capturing positions. Reference numerals D1 and Dn in FIG. 5 show the image capturing positions when capturing images of the marker, and F1 and Fn show ranges where images can be captured with one pixel of imaging element (CCD) of the camera.

In such an image capturing, it is known that the longer a distance Lmax between one image capturing position D1 and the other image capturing position Dn (when capturing three or more images, the distance is one between two image capturing positions furthest in these positions, and is referred to as "the baseline length" in the specification) is, the better a measurement accuracy is (see non-patent related document 1). That is, in a case where images of one marker are captured from two image capturing positions D1 and Dn as shown in FIG. 5, a range where image capturing is possible with an imaging element 1 pixel has a spatial expanse as shown with reference numbers F1, Fn, and its intersection has a sector shape (diamond-shape) as shown with a reference number G. In the intersection G having a sector shape, a position of an upper intersecting point H1 is computed in some cases, and a position of a lower intersecting point H2 is computed in the other cases. And, it is generally known that the smaller a distance J between the upper and lower intersecting points H1 and H2 is, the better accuracy of the position measurement is. It is also generally known that in order to shorten the distance J between the upper and lower intersecting points H1 and H2, the baseline length Lmax is made longer and the above-mentioned sector shape is made a laterally elongated shape (horizontally flat).

On the other hand, it is theoretically sufficient that the images of one marker are captured from two positions in the above-mentioned three-dimensional measurement. But, in order to reduce influences of noises (a shift of pixel designation for an object to be measured), the image capturing from more positions, such as ten positions, is desired.

That is, it is better to make the baseline length Lmax longer when capturing images of each marker, and to obtain many images in the above-mentioned three-dimensional measurement.

SUMMARY OF INVENTION

Problems to be Solved by Invention

If judgments as to how long the baseline length Lmax is, or how many images of one marker the camera should captures are left to an individual who captures images, a precision of the three dimensional measurement is different, depending on the persons. Especially, if the person who captures images through the camera is a beginner unfamiliar with photographing, such a person is easy to capture images from biased direction and is not able to take the longer baseline length Lmax in many cases or does not capture many images, so that the precision of the three-dimensional measurements is easy to deteriorate.

An object of the invention is to provide a position measurement device and a position measurement method for solving the above-mentioned problems.

Means for Solving Problems

The first aspect of the invention is exemplarily shown in FIG. 1, and is a position measurement device (1) that captures two or more images of one marker (M1, M2, M3 or M4) from two or more angles while moving a camera (2) and obtains a three-dimensional position of the marker (M1, M2, M3 or M4) and/or the camera (2) based upon the obtained images, comprising:

a camera position calculator (3) that calculates an image capturing position (D1, Dn of FIG. 5) of the camera (2) at each moment when capturing images of the marker (M1, M2, M3 or M4) twice or more times; and an image capturing position output (4) that outputs two or more image capturing positions (D1, Dn) of the camera (2) calculated through the camera position calculator (3) and/or non-image capturing positions (E1, E2 of FIG. 5) where the camera (2) additionally capture images.

The second aspect of the invention is the position measurement device, wherein the image capturing position output (4) indicates two or more line segments (B1, B2, B3, B4 of FIG. 2) on the image, each connecting one point of one marker (M1, M2, M3 or M4) and each image capturing position of the camera (2) with each other.

The third aspect of the invention is the position measurement device, wherein the image capturing position output (4) paints over between two or more line segments (B1, B2, B3, B4) and indicates it with a sector (C1, C2, C3, C4 of FIG. 3).

The fourth aspect of the invention is the position measurement device, further comprising a baseline length calculator (6) that calculates a baseline length (Lmax of FIG. 5) which is a distance between two image capturing positions far most (D1, Dn) on the basis of two or more image capturing positions (D1, Dn) of the camera (2) which are calculated through the camera position calculator (3), and a baseline length output (7) that outputs the baseline length (Lmax) calculated through the baseline length calculator (6).

The fifth aspect of the invention is a position measurement method for capturing two or more images of one marker (M1, M2, M3 or M4) from two or more angles while moving a camera (2) and obtaining a three-dimensional position of the marker (M1, M2, M3 or M4) and/or the camera (2) based upon the obtained images, comprising:

a step of calculating an image capturing position (D1, Dn) of the camera (2) at each moment when capturing images of the marker twice or more times through a camera position calculator (3); and a step of outputting two or more image capturing positions (D1, Dn) of the camera (2) calculated through the camera position calculator (3) and/or non-image capturing positions (E1, E2 of FIG. 5) where the camera (2) should additionally capture images through an image capturing position output (4).

The sixth aspect of the invention is the position measurement method, wherein the image capturing position output (4) indicates two or more line segments (B1, B2, B3, B4 of FIG. 2) on the image, each connecting one point of one marker (M1, M2, M3 or M4) and each image capturing position (D1, Dn) of the camera (2) with each other.

The seventh aspect of the invention is the position measurement method, wherein the image capturing position output (4) paints over between two or more line segments (B1, B2, B3, B4) and indicates it with a sector (C1, C2, C3, C4 of FIG. 3).

The eighth aspect of the invention is the position measurement device, further comprising a step of calculating a baseline length (Lmax) which is a distance between two image capturing positions (D1, Dn) far most on the basis of two or more image capturing positions (D1, Dn) of the camera (2) which are calculated by the camera position calculator (3) through the baseline length calculator (6), and a step of outputting the baseline length (Lmax) calculated through the baseline length calculator (6) through a baseline length output (7).

The number in parentheses shows the corresponding element in the drawings for the sake of convenience, accordingly, the descriptions are not restricted and bound by the descriptions on the drawings.

Effects of Invention

According to the first to the eight aspects of the invention, it is configured to output the image capturing position of the camera at each moment when capturing images of the marker twice or more times and/or the non-image capturing positions where the camera should additionally capture images. Then, it is possible for the person who captures images through the camera to capture the images of the marker from proper directions, watching the output so as to make the baseline length longer. At the result, it is possible to perform the three-dimensional measurement with good precision even if the photographer is a beginner.

EMBODIMENTS FOR CARRYING OUT THE INVENTION

Embodiments of the invention are mentioned, referring to appended drawings FIGS. 1 to 4.

Figure 1:
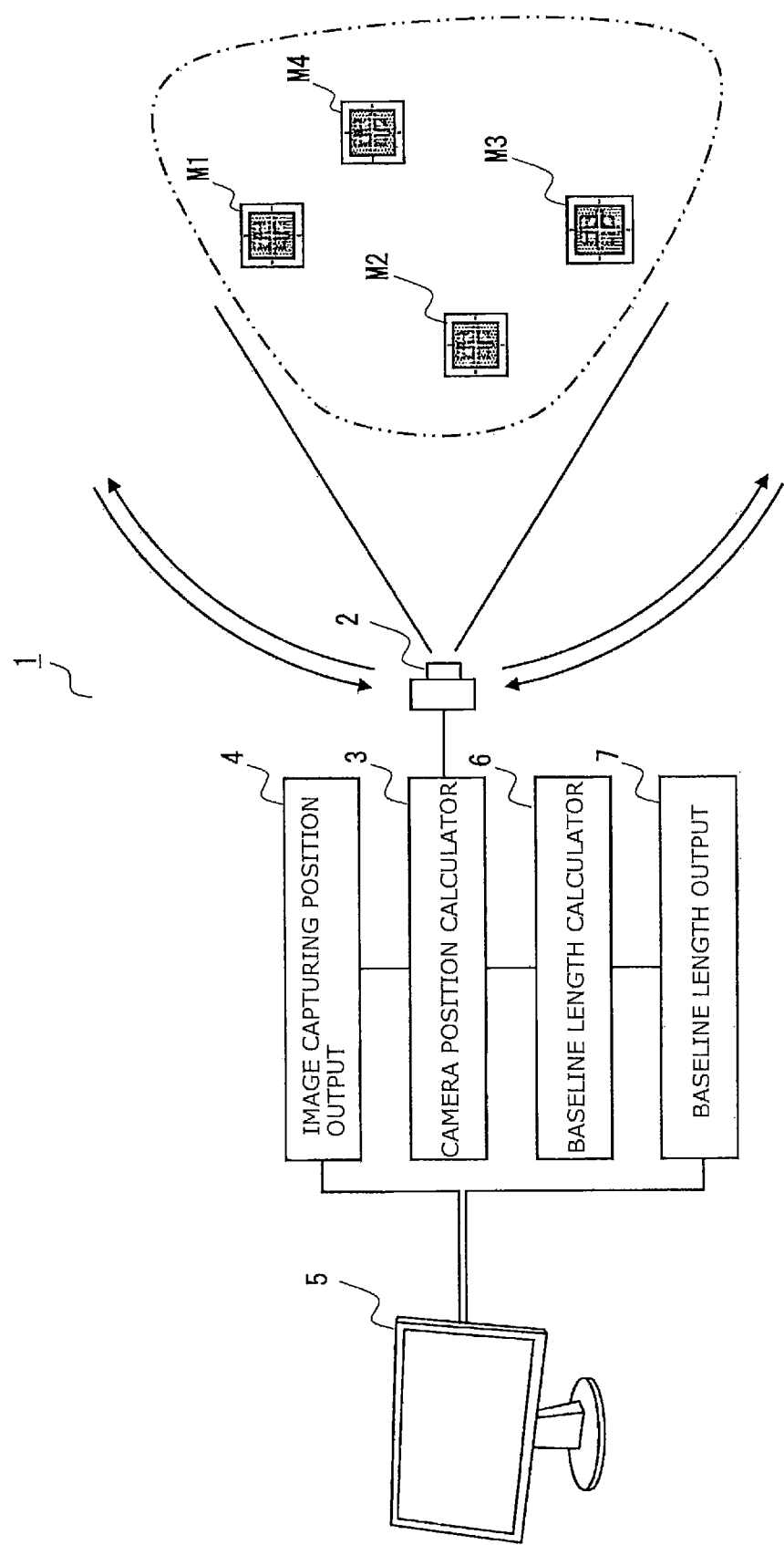
FIG. 1 is a block diagram that shows an instance of a configuration of a position measurement device according to the invention.
Figure 5:
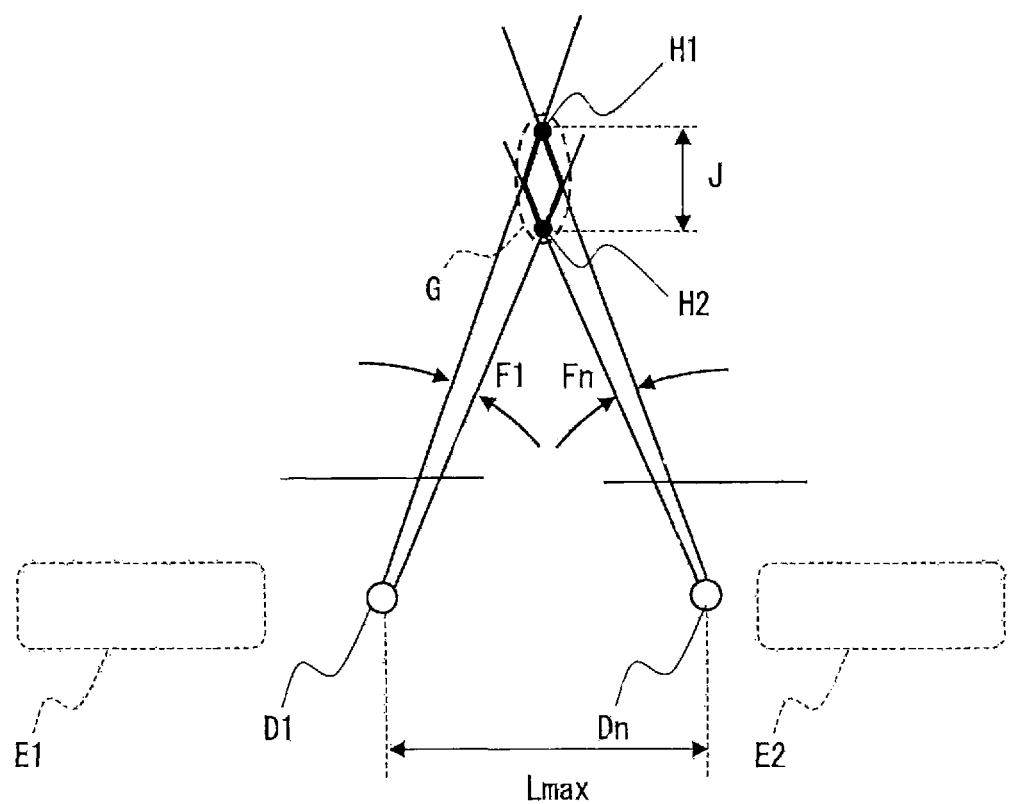
FIG. 5 is a typical view that shows an instance of a way of capturing images of the markers from two image capturing positions.

A position measurement device that is exemplarily shown with a reference number 1 in FIG. 1 is one for performing three-dimensional measurement with good precision with a camera, and captures two or more images (see A1, A2, A3 of FIG. 4(a)) of a marker M1, M2, M3 or M4 from different angles while moving a camera 2, and obtains a three-dimensional position of the marker M1, M2, M3 or M4 and/or the camera 2 based on the obtained images. The position measurement device 1 has a camera position calculator 3 that calculates an image capturing position of the camera 2 at each moment when capturing images of the marker M1, M2, M3 or M4 twice or more times, and an image capturing position output that outputs two or more image capturing positions of the camera 2 (see reference numerals D1, Dn of FIG. 5, for instance) calculated through the camera position calculator 3 and/or non-image capturing positions where the camera 2 additionally captures images (see reference numerals E1, E2, for instance). The above-mentioned camera 2 is not a stereo camera, but a so-called monocular camera. A three-dimensional measurement in the specification is a concept including both SLAM (Simultaneous Localization and Mapping) and SFM (structure from motion). And, the image capturing position output 4 may indicate the image capturing position and/or the non-image capturing position of the camera 2 on a display 5, such as a liquid crystal panel, or may print out the image capturing position and/or the non-image capturing position of the camera 2. Besides, the non-image capturing position of the camera 2 means a position where image capturing is recommended in order to lengthen the baseline length Lmax. And, the image capturing position and/or the non-image capturing position of the camera 2 are indicated with various well-known figures.

According to the invention, the camera position output 4 is configured to output each image capturing position of the camera 2 at a moment when capturing images of the marker M1, M2, M3 or M4 twice or more times and/or the non-image capturing position where the camera 2 additionally captures images, so that it is possible for a photographer of the camera 2 to capture images of the marker M1, M2, M3 or M4 from proper directions (so that a central angle of each sector becomes 120 degrees), watching the output and possible to lengthen the baseline length Lmax. At the result, it is possible to perform good precision three-dimensional measurement even if the photographer is a beginner.

Figure 2:
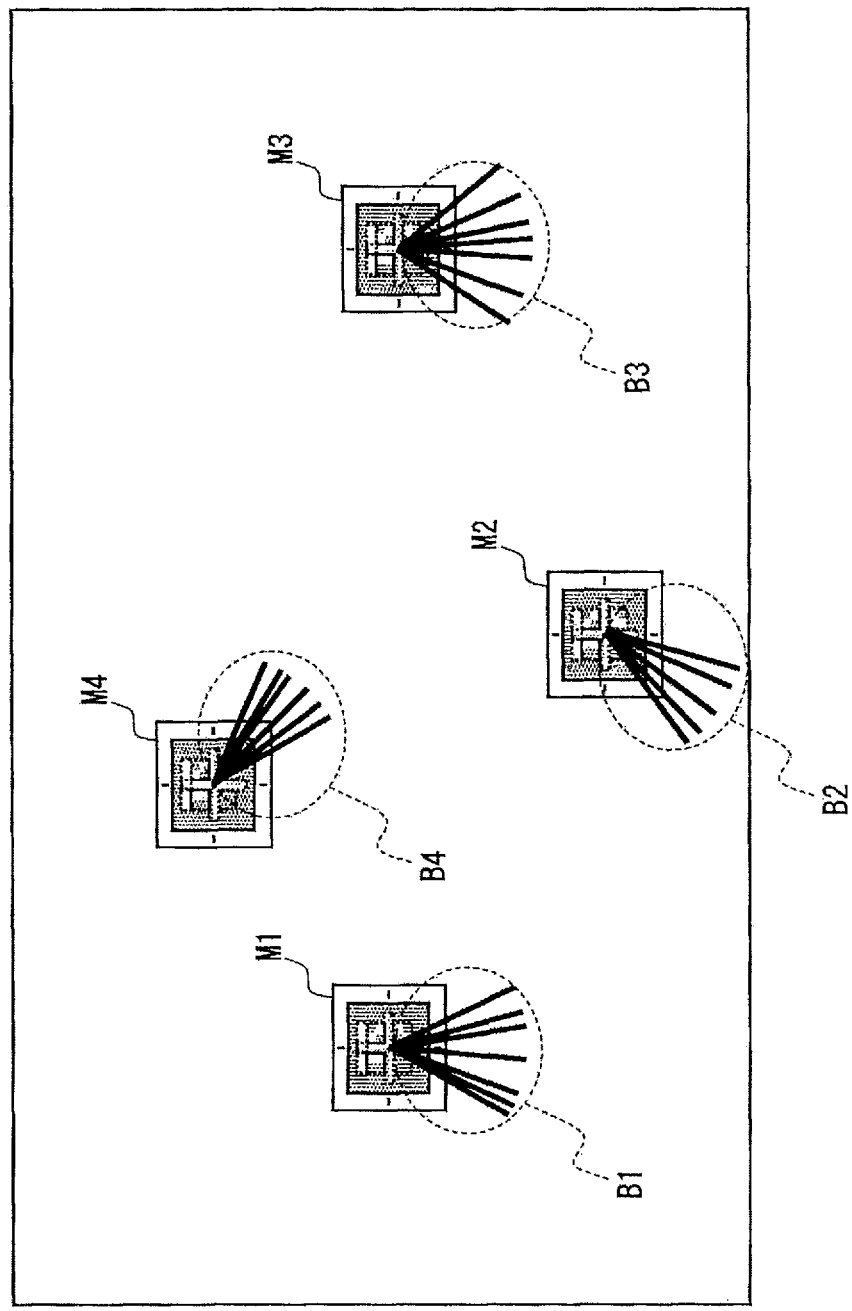
FIG. 2 is a typical view that shows an instance of a display screen of the position measurement device according to the invention.
Figure 3:
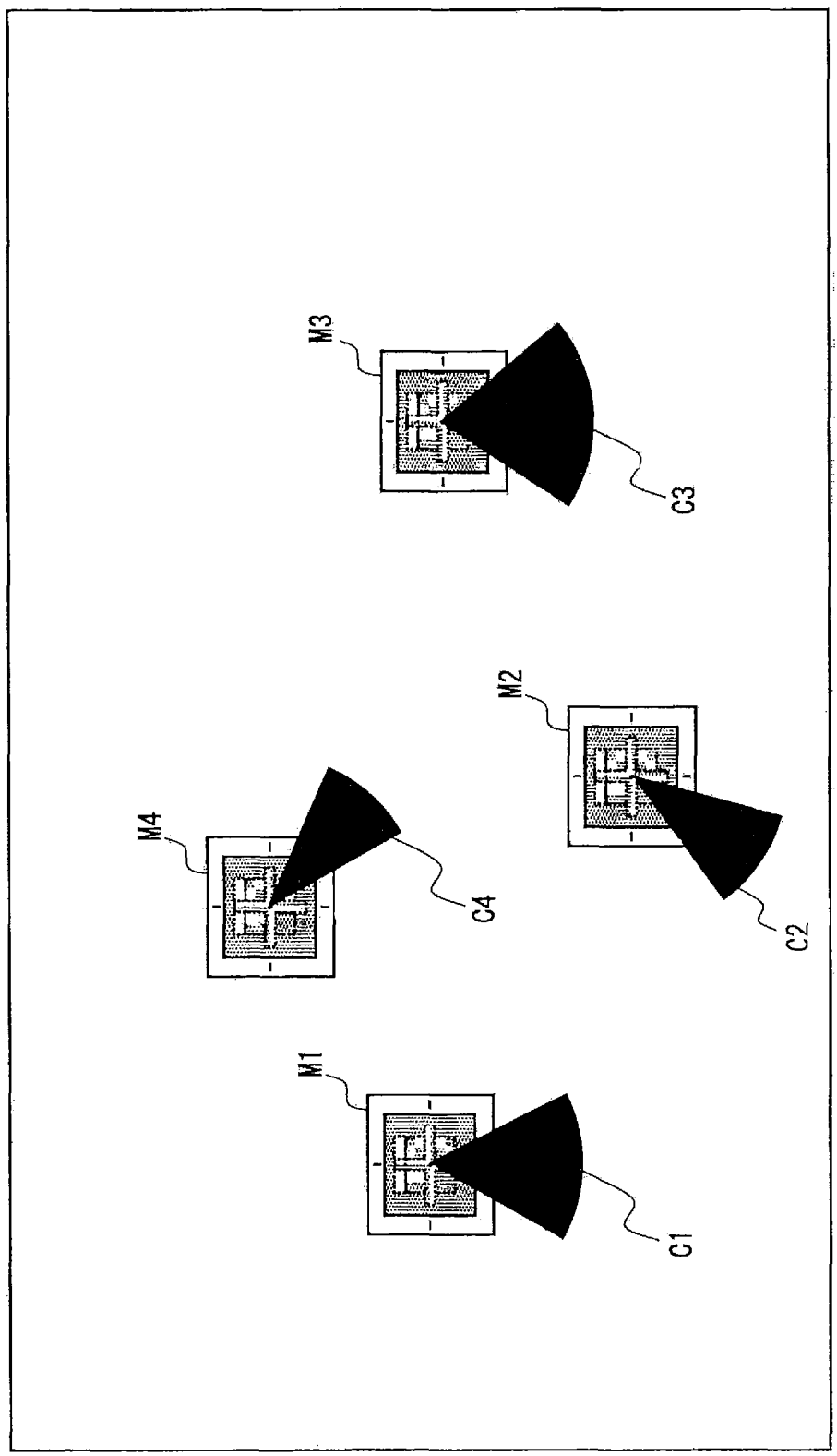
FIG. 3 is a typical view that shows the other instance of the display screen of the position measurement device according to the invention.
Figure 4:
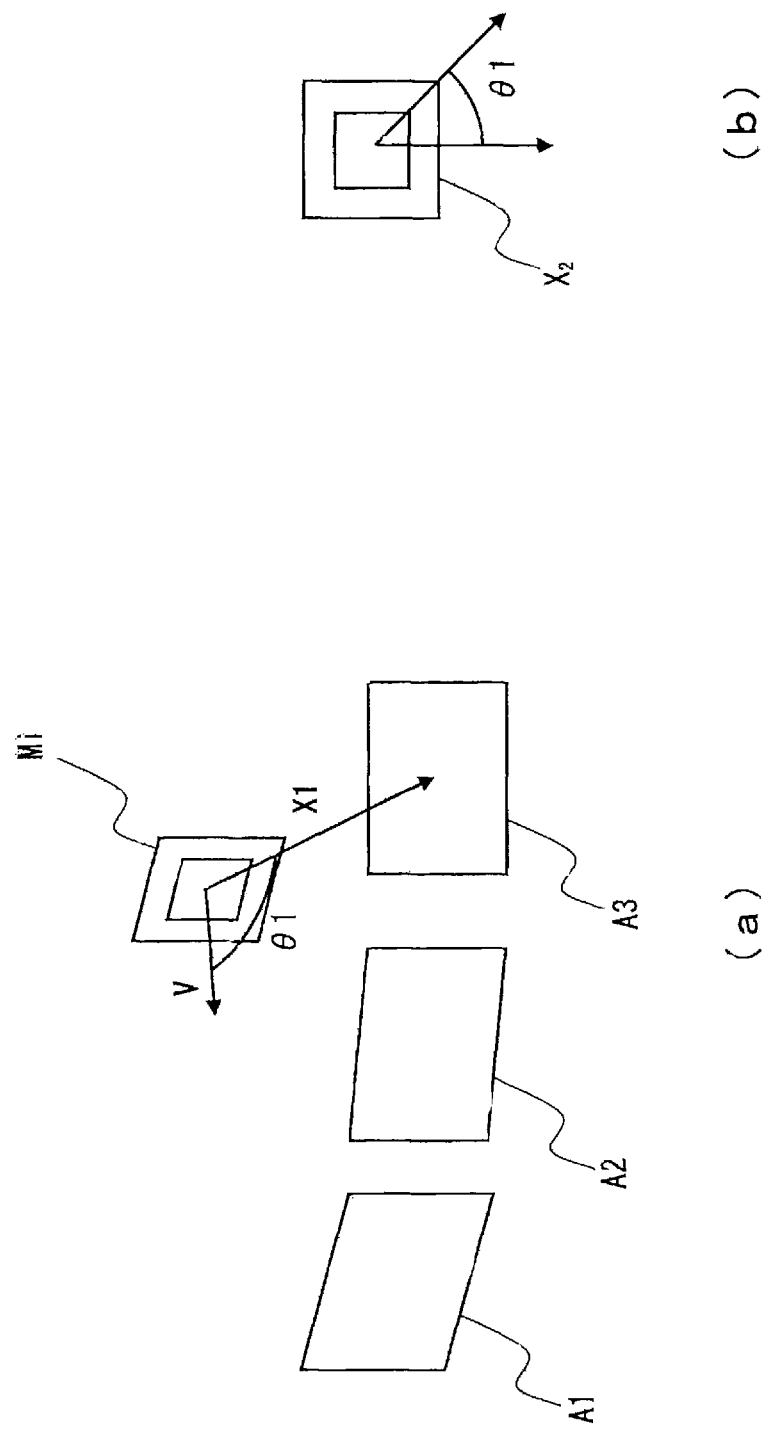
FIG. 4(a) is a typical view that shows a positional relation between a marker and a captured image in an actual three-dimensional space.
FIG. 4(b) is a typical view that shows the marker and a vector in the display screen (the vector from a center of the marker to an image capturing position or a normal vector of the marker).

In such a case, as exemplarily shown in FIG. 2, the image position output 4 may be configured to indicate two or more line segments B1, B2, B3 and B4 each connecting between one point of the marker M1, M2, M3 or M4 and each image capturing position of the camera 2 on the image. As exemplarily shown in FIG. 3, gaps between these line segments B1, B2, B3 or B4 may be painted over with black color and sectors C1, C2, C3 and C4 may be indicated. By doing so, it is possible to sensuously grasp the image capturing position or the non-image capturing position of the camera 2. For instance, it is known that the sectors C1, C4 are large in the center angles and show the image capturing from wide directions, and on the other hand, the sectors C2, C3 are small in the center angles and shows the image capturing from narrow directions. The photographer is able to additionally capture the images, watching such an indication, so that the photographer is able to obtain the images from wide directions and preform the three-dimensional measurement with high precision.

As exemplarily shown in FIG. 4(a), if a three-dimensional normal vector of the marker is V and a vector showing the image capturing position which a basic point is a point of the marker, such as a center point is X, an angle θi defined by the vector is given by the following expression wherein marks V and X represent vectors shown with bold characters in the expression. And, the mark i is a number assigned on the image capturing position.

$$\theta i = \cos^{-1} \frac{V \cdot X_i}{\|V\|\|X_i\|} \quad \text{[Expression 1]}$$

Besides, the position measurement device 1 may have a baseline length calculator 6 that calculates a baseline length Lmax which is the distance between two image capturing positions far most on the basis of two or more image capturing positions of the camera 2 which are calculated through the camera position calculator 3, and a baseline length output 7 that outputs the baseline length Lmax calculated through the baseline length calculator 6. The baseline length output 7 may indicate the baseline length Lmax on the display 5, such as a liquid crystal panel, or may print out the baseline length Lmax. Besides, the baseline length Lmax may be indicated with well-known various figures.

On the other hand, the position measurement method according to the invention is one for capturing two or more images of one marker M1, M2, M3 or M4 from two or more angles while the camera 2 is moving and obtaining a three-dimensional position of the marker and/or the camera 2 based upon the captured images A1, A2, A3, and has a step of calculating an image capturing position of the camera at each moment when capturing images of the marker M1, M2, M3 or M4 twice or more times through the camera position calculator 3, and a step of outputting two or more image capturing positions of the camera 2 that are calculated through the camera position calculator and/or the non-image capturing positions where the camera additionally captures images through the image position output 4.

According to the invention, it is configured to output the image capturing position of the camera 2 at each moment when capturing images of the marker M1, M2, M3 or M4 twice or more times and/or the non-image capturing positions where the camera should additionally capture images. Then, it is possible for the person who captures images through the camera 2 to capture the images of the marker M1, M2 M3 or M4 from proper directions (for instance, in order to make the center angle of each sector 120 degrees), watching the output so as to make the baseline length Lmax longer. At the result, it is possible to perform the three-dimensional measurement with good precision even if the photographer is a beginner.

In this case, the image position output 4 may be configured to indicate two or more line segments each connecting one point in one marker M1, M2, M3 or M4 and each image capturing position of the camera 2 with each other, as exemplarily shown in FIG. 2. Besides, it may be configured to paint over the gaps between these line segments B1, B2, B3 and B4 and indicate the sectors C1, C2, C3 and C4, as exemplarily shown in FIG. 3. In such indications, it is possible to sensibly grasp the image capturing positions and non-image capturing positions of the camera 2. For instance, it is known that the sectors C1, C4 are large in the center angles and show the image capturing from wide directions, and on the other hand, the sectors C2, C3 are small in the center angles and shows the image capturing from narrow directions. The photographer is able to additionally capture the images, watching such an indication, so that the photographer is able to obtain the images from wide directions and preform the three-dimensional measurement with high precision.

The method may have a step of calculating the baseline length Lmax which is the distance between two image capturing positions far most on the basis of two or more image capturing positions of the camera which are calculated through the camera position calculator 3, and a step of outputting the baseline length Lmax calculated by the baseline length calculator 6 through the baseline length output 7.

EXPLANATION OF REFERENCE NUMBERS 1 position measurement device
2 camera
3 camera position calculator
4 image capturing position output
6 baseline length calculator
7 baseline length output
B1, B2, B3, B4 line segment
C1, C2, C3, C4 sector
D1, Dn image capturing position of camera
E1, E2 non-image capturing position to be additionally imaged
Lmax baseline length
M1, M2, M3, M4 marker

The invention claimed is:

1. Position measurement device that captures two or more images of one marker from two or more angles while moving a camera and obtains a three-dimensional position of the marker and/or the camera based upon the obtained images, comprising:
   a camera position calculator that calculates an image capturing position of the camera at each moment when capturing images of the marker twice or more times; and
   an image capturing position output that outputs two or more image capturing positions of the camera calculated through the camera position calculator and/or non-image capturing positions where the camera should additionally capture images.

2. The position measurement device according to claim 1, wherein the image capturing position output paints over between two or more line segments and indicates it with a sector.

3. The position measurement device according to claim 1 or claim 2, further comprising a baseline length calculator that calculates a baseline length which is a distance between two image capturing positions far most on the basis of two or more image capturing positions of the camera which are calculated through the camera position calculator, and a baseline length output that outputs the baseline length calculated through the baseline length calculator.

4. A position measurement method for capturing two or more images of one marker from two or more angles while moving a camera and obtaining a three-dimensional position of the marker and/or the camera based upon the obtained images, comprising:
   a step of calculating an image capturing position of the camera at each moment when capturing images of the marker twice or more times through a camera position calculator; and
   a step of outputting two or more image capturing positions of the camera calculated through the camera position calculator and/or non-image capturing positions where the camera should additionally capture images through an image capturing position output.

5. The position measurement method according to claim 4, wherein the image capturing position output paints over between two or more line segments and indicates it with a sector.

6. The position measurement device according to claim 4 or claim 5, further comprising a step of calculating a baseline length which is a distance between two image capturing positions far most on the basis of two or more image capturing positions of the camera which are calculated by the camera position calculator through the baseline length calculator, and a step of outputting the baseline length calculated through the baseline length calculator through a baseline length output.

* * * * *